United States Patent [19]
O'Neill

[11] Patent Number: 5,774,690
[45] Date of Patent: Jun. 30, 1998

[54] METHOD FOR OPTIMIZATION OF ELEMENT PLACEMENT IN A THINNED ARRAY

[75] Inventor: Daniel J. O'Neill, Jamestown, R.I.

[73] Assignee: The United States of America as represented by the Secetary of the Navy, Washington, D.C.

[21] Appl. No.: 536,310

[22] Filed: Sep. 14, 1995

[51] Int. Cl.$^6$ ........................................... H04B 17/00
[52] U.S. Cl. ........................... 395/500; 395/13; 367/13; 367/56; 367/62
[58] Field of Search ................ 395/500, 13; 364/726, 364/491; 342/379; 382/159; 367/13, 19, 22, 56, 62, 905

[56] References Cited

U.S. PATENT DOCUMENTS

| | | | |
|---|---|---|---|
| 4,559,605 | 12/1985 | Norsworthy | 364/726 |
| 5,136,686 | 8/1992 | Koza | 395/13 |
| 5,140,530 | 8/1992 | Guha et al. | 395/13 |
| 5,249,259 | 9/1993 | Harvey | 395/13 |
| 5,343,211 | 8/1994 | Kott | 342/379 |
| 5,343,554 | 8/1994 | Koza et al. | 395/13 |
| 5,479,523 | 12/1995 | Gaborski et al. | 382/159 |
| 5,517,463 | 5/1996 | Hornbostel et al. | 367/13 |
| 5,557,533 | 9/1996 | Koford et al. | 364/491 |

OTHER PUBLICATIONS

"Element Placement in Thinned Arrays Using Genetic Algorithms", by D.J. O'Neill, IEEE, Proceedings of OCEANS '94 Conference, 13–16 Sep. 1994, pp. II–301 –II–306.

*Primary Examiner*—Michael Zanelli
*Assistant Examiner*—Russell W. Frejd
*Attorney, Agent, or Firm*—Michael J. McGowan; William F. Eipert; Prithvi C. Lall

[57] ABSTRACT

A method for generating a thinned array having an optimal directional response wherein an initial population of possible element occupancy patterns is generated and a relative fitness value for each of the element occupancy patterns in the initial population is determined. Successive populations are generated by manipulating the element occupancy patterns using reproduction, crossover, mutation, elitism, and equality operators. The array response of each occupancy pattern in the successive population is evaluated to determine a fitness value for each. The process of generating and evaluating successive populations is repeated for a specified number of generations, until the maximum population fitness does not significantly increase between generations, or until the population diversity decreases.

17 Claims, 3 Drawing Sheets

5,774,690

METHOD FOR OPTIMIZATION OF ELEMENT PLACEMENT IN A THINNED ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a method for determining the placement of elements in a thinned array. More specifically, the present invention relates to the application of genetic algorithm techniques in a method for near-optimal element placement in a discrete sparse array lattice.

(2) Description of the Prior Art

Thinned beamforming arrays are often designed to reduce the fabrication costs, the array size, and/or the real-time data processing requirements associated with large array systems. Thinned arrays address these limitations by using fewer discrete elements than the total number of elements permitted by the physical dimensions of the array substrate. With proper thinning of the array, an optimal directional response (minimal mainlobe width and minimal peak sidelobe level) can be obtained. However, improper thinning of the array elements will lead to poor performance with increased mainlobe widths and often severe and unpredictable peak sidelobe levels.

Several methods have been developed for determining the placement of the array elements to obtain an optimal directional response. The most direct approach, known as spatial tapering, places elements such that nearest-neighbor spacing between elements is inversely proportional to a chosen ideal continuous window function. For arrays without discrete lattice constraints, this approach often yields a directional response close to that of the underlying continuously weighted array in the vicinity of the main response direction, but often gives rise to severe and unpredictable sidelobes at the angular extremes of the receptive field. Furthermore, placement in a discrete lattice is problematic because the inter-element spacing is only an approximation of the desired spacing with elements in the center region too far apart. Additionally, this approach is poorly suited to the approximation of a uniformly weighted line array because it would yield repetitive inter-element spacings greater than half the wavelength, producing grating lobes in the array response pattern.

In contrast to the deterministic spatial tapering method is the use of random perturbations from equal spaced elements or "random arrays." It is known that randomized element locations may be used to destroy the periodicity inherent in the array factor in an equally spaced line array. Furthermore, large perturbations can make it possible to operate the array over the design frequency, decrease beamwidth, and eliminate grating lobes.

The technique of generating random arrays involves probabilistic methods. In this approach, the location of each element is a random variable drawn from a probability density function which is proportional to a desired excitation function. While the exact response characteristics of the resulting array are unpredictable, the amplitude characteristics of sidelobes can be described statistically. Unfortunately, this technique does not apply directly to fixed lattice grids. Furthermore, repetitive generation of multiple array configurations constitutes a random search, with no tendency for successive improvement. Therefore, random array generation requires the evaluation of a large number of possible arrays to identify one with an optimal response. Thus, random array generation is not an efficient technique because of the large number of possible arrays which must be evaluated.

Thus, what is needed is a method for determining element placement in a thinned array which provides an optimal element placement pattern for a fixed lattice thinned array.

SUMMARY OF THE INVENTION

Accordingly, it is a general purpose and object of the present invention to provide a method for determining an optimal element placement for a fixed lattice thinned array.

Another object of the present invention is to provide a method for determining an optimal element placement for a thinned array which does not constitute a random search.

A further object of the present invention is the provision of a method for generating an optimal element placement pattern for a thinned array which does not require computation of substantially all placement patterns to identify an optimal placement pattern.

These and other objects made apparent hereinafter are accomplished with the present invention by providing a method, performed with the aide of a programmed controlled computer, for generating a thinned array having an optimal directional response. The method generates an initial population of possible element occupancy patterns and determines a fitness value for each of the element occupancy patterns in the initial population. Successive populations are generated by manipulating the element occupancy patterns using reproduction, crossover, mutation, elitism, and equality operators. The array response of each occupancy pattern in the successive population is evaluated to determine a fitness value for each. The process of generating and evaluating successive populations is repeated for a specified number of generations, until the maximum population fitness does not significantly increase between generations, or until population diversity decreases.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1A:
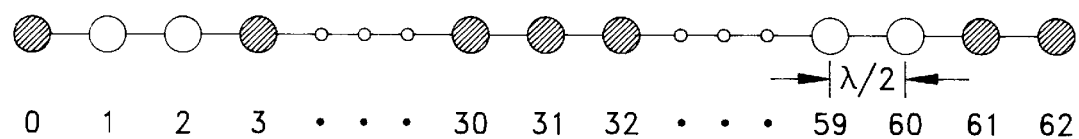
FIGS. 1A and 1B show illustrations of an element placement problem for a thinned array.

A thinned array problem can be defined as the placement of elements in an array lattice to obtain an array with an optimal response. The elements can comprise any conventional sensor for the desired application such as a hydrophone, a pressure sensor, an optical sensor, or the like. Referring to FIG. 1A, there is shown an illustration of a sample thinned array problem of placing 31 elements in a linear lattice of 63 possible locations.

In FIG. 1A, the elements comprise hydrophones and the solution to the thinned array problem seeks a thinned array with an optimal directional response (that is, an array having a beam pattern with a minimal mainlobe width and a minimal peak sidelobe level). The lattice of FIG. 1A is a regular array lattice of $\lambda/2$ spacing, where $\lambda$ is the propagating wavelength. The 63 discrete lattice positions are identified as locations 0 through 62. Locations with solid circles (locations 0, 3, 30, 31, 32, 61, and 62) represent lattice positions occupied by elements.

Using a conventional random generation technique, element placement within the array is selected at random, the directional response of the array is evaluated, and the process is repeated until a satisfactory directional response is obtained. For the relatively simple array problem illustrated in FIG. 1A the number of possible 31 element arrays which can be built is large enough (over $9 \times 10^{17}$ possible patterns for uniformly weighted elements) to discourage this technique. Additionally, evaluating the directional response of an array is computationally complex and requires a relatively long period of time to complete. Furthermore, each of the possible arrays is independent of the others, and the element placement in successive arrays is unaffected by the directional response of previous arrays. Thus, to ensure that an optimal array is obtained requires an exhaustive search of all possible patterns.

Figure 1B:
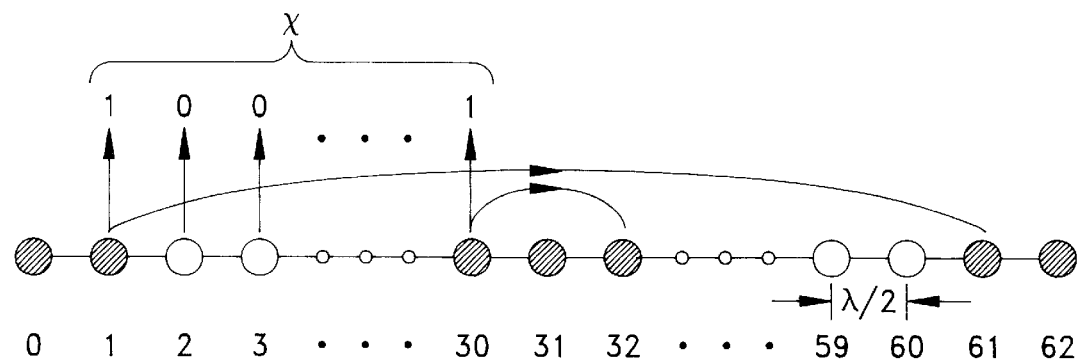

To reduce the number of possible 31 element arrays which can be built, several simplifying constraints are often incorporated. FIG. 1B illustrates the thinned array problem of FIG. 1A with the following simplifying constraints: (1) the elements are uniformly weighted; (2) the center and two end lattice positions, locations 0, 31, and 62, are always occupied; and (3) the array is bilaterally symmetric (the array pattern of one side of the array mirrors the other). Within these constraints, the problem can be recast as the derivation of an element occupancy pattern x, representing the placement of elements in one side of the array, exclusive of the end position, that provides an optimal directional response. These constraints do not significantly reduce the computation time to evaluate the directional response of the array nor do they improve the efficiency of the random array technique. However, they do reduce the number of possible solutions to 145,422,675 which makes evaluation of all possible array patterns computationally feasible. Thus, it is readily apparent that, unless the array is relatively simple, exhaustive enumeration is not practical and, at times, is not even possible because of the large number of trials required to ensure a satisfactory directional response has been obtained.

In the present invention, conventional techniques such as the random generation process are replaced with an optimization method that employs genetic algorithm techniques. The present invention provides an efficient and practical process for determining the placement of elements within an array to yield an array having a near-optimal directional response and can be applied to thinned array problems having an extremely large number of possible arrays. Additionally, the inventive method frequently arrives at a near-optimal solution in less time and with fewer computations than current techniques.

The present invention segments the array generation (element placement) process into two domains. A genetic operator domain manipulates existing element placement patterns to construct new element placement patterns. An element placement pattern (EPP) defines the placement and weighting (shading) of elements (e.g., hydrophones, pressure sensors, optical sensors) within the array. The genetic operators construct new EPPs using fitness proportionate selection and recombinant crossover mechanisms. In the problem domain, the fitness of each EPP is determined based on the directional response characteristics of the array it encodes. Determination of the fitness is the only interface between the two domains; this confers a generality to the genetic operators that permits application to wide range of thinned array problems.

Figure 2:
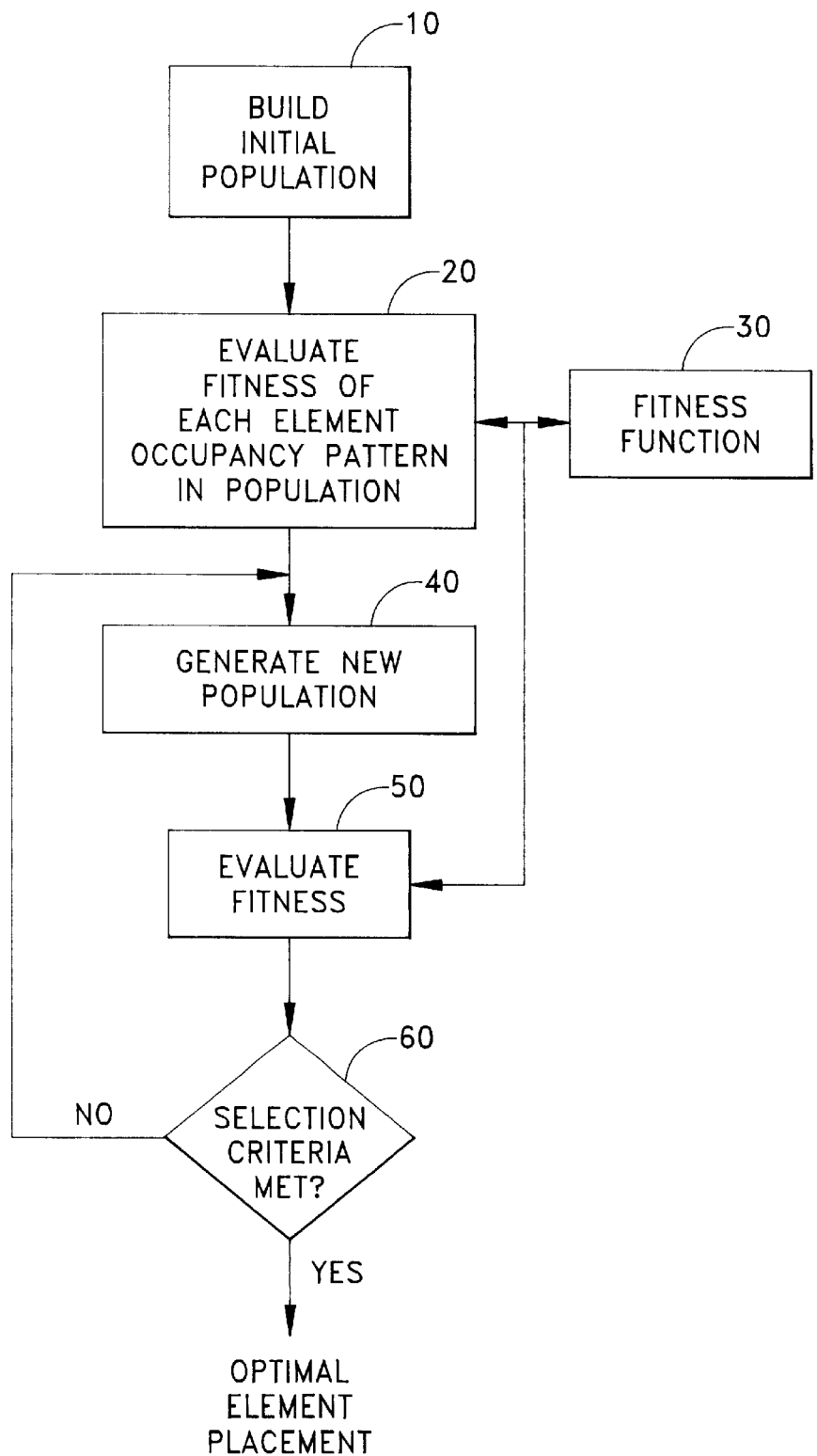
FIG. 2 is a block diagram of a method for generating a thinned array having an optimal directional response in accordance with the present invention.

Referring now to FIG. 2, there is shown a block diagram of a method for generating a thinned array having an optimal directional response in accordance with the present invention. In step 10, build initial population, an initial population containing a plurality of arrays, each having different element placement, is built. Evaluate fitness step 20 analyzes the directional response characteristics of each array. Using this directional response, step 20 employs a "fitness" function 30 to generate a fitness value for each array. The fitness value provides a measure for comparing the directional response of the array with the response of other arrays.

In generate new population step 40, the current population is manipulated by genetic operators to create a new population of arrays. Step 50 uses fitness function 30 to evaluate the fitness of each array in the new population. Steps 40 and 50 are repeated until step 60 determines that one or more arrays or the population meets a predetermined threshold.

In FIG. 2, step 20 (and 50) along with fitness function 30 comprises the problem domain, while step 40 comprises the genetic operator domain. Step 40 uses several genetic operators to manipulate the candidate thinned array problem solutions. In contrast to conventional techniques which operate upon a single solution at a time, the genetic operators employed in the present invention are a series of operators which act upon the population (set of arrays) simultaneously. Step 40 manipulates the element placement within an array using reproduction, crossover, mutation, elitism, and equality operators.

Figure 3:
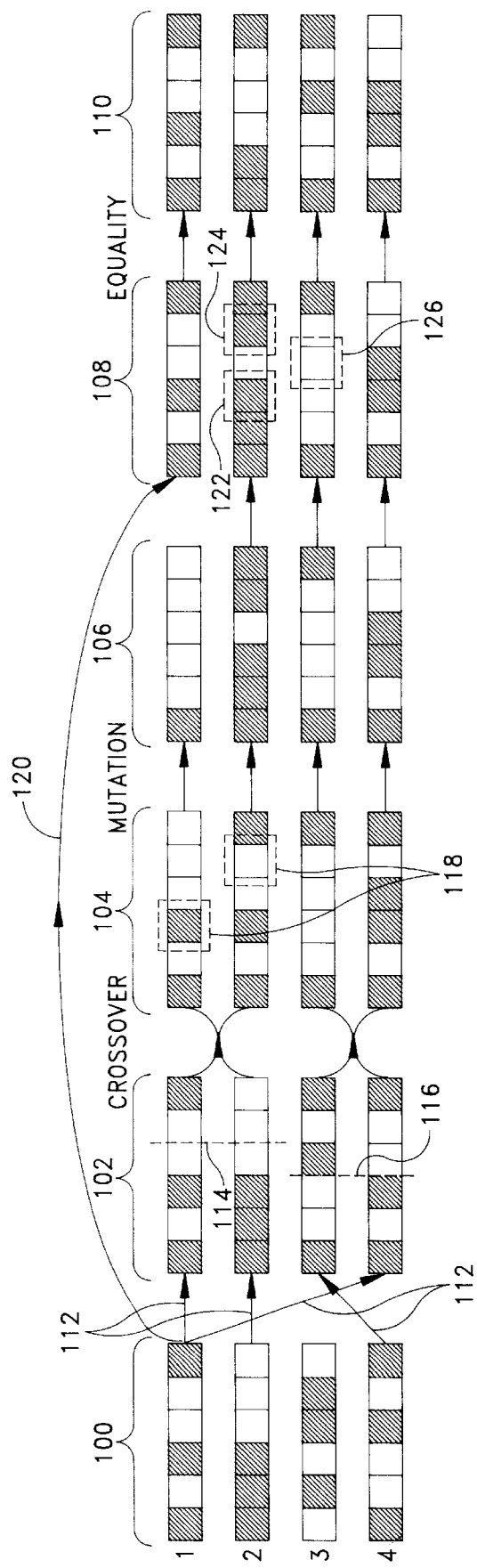
FIG. 3 illustrates the operation of the reproduction, crossover, mutation, elitism, and equality operators used by the present invention.

The operation of the reproduction, crossover, mutation, elitism, and equality operators used by step 40 is illustrated in FIG. 3. A population 100, comprising four EPPs each having three uniformly weighted elements within a linear lattice of six locations contains the EPPs to be manipulated by the operators. In the EPPs shown, a full lattice location (a location containing an element) is shown as a solid square. Population 100 is the initial or current population. Populations 102, 104, 106, and 108 are intermediate populations, each generated using one of the operators, and population 110 is a successor population. A full iteration of the entire sequence of genetic operations is known as a generation.

The reproduction operator selects EPPs from population 100 for retention with probability proportional to their relative fitness values. EPPs can be reproduced more than once. Preferably, the operation ends when a reproduction population 102 contains the same number of EPPs as the initial population. Because fit individuals, that is, EPPs with higher fitness values, are more likely to reproduce more often than unfit individuals, the reproduction population will tend to have a greater aggregate fitness. Arrows 112 indicate parentage of the EPPs in population 102, that is, the EPPs from population 100 selected by the reproduction operator for retention.

The crossover operator pairs EPPs at random and exchanges contents about randomly selected crossover points, depicted by dotted lines 114 and 116. That is, the two EPPs in rows 3 and 4 of population 102 exchanged contents of the last three lattice locations to generate the EPPs in rows 3 and 4 of crossover population 104. The crossover operator can also operate to exchange contents of a series of lattice locations chosen out of the middle of the EPP. That is, exchange contents of lattice locations 2, 3, and 4 in one EPP with locations 2, 3, and 4 in a second EPP. The crossover operator permits the best parts of two individual EPPs to recombine and produce an EPP with a greater fitness.

The mutation operator toggles the lattice locations of each EPP ("empty" to "full", or "full" to "empty") with low probability. This operator continuously introduces new variability into the population of solutions and partially counteracts the tendency of the reproduction operator to reduce diversity. Typically, the mutation operator acts with a probability below 0.01. In FIG. 3, elements 118 in the patterns of population 104 were selected for mutation to generate population 106.

Elitism replaces a randomly selected EPP with the most fit EPP of the previous population. In FIG. 3, the elitism operator (indicated by arrow 120) replaces an EPP in population 108 with the most fit EPP from the initial population 100. This prevents the destruction of the most successful solution until it is replaced by a better one. Therefore, the maximum fitness of the population at each generation will not decrease.

The equality operator restricts the search to only those EPPs which contain a desired number of elements, d. This operator ensures that the EPPs generated by the previous genetic operators do not contain more elements than permitted by the design constraints (fabrication costs, array size, real-time data processing requirements). This operator acts only upon those EPPs which do not have a total number of elements equal to d. Optionally, the equality operator can act to ensure that the patterns contain no more than d and no less than d' elements.

When more than d elements are present, the equality operator randomly selects a number of elements equal to the difference of total number of elements and the desired number of elements d and removes those elements from the array (toggles these locations in the EPP to "empty". For the example shown in FIG. 3 (where d=3), the EPP in row 2 of population 108 contains five elements; therefore, the equality operator randomly selects two full locations (122 and 124) and toggles these locations to empty. Similarly, when the EPP contains fewer than the desired number of elements, the equality operator fills randomly selected empty locations with elements until the EPP contains the desired number of elements. For example, in FIG. 3 location 126 is filled with an element to bring the EPP in row 3 of population 108 up to the desired number of elements.

Referring again to FIG. 2, in step 10 the initial population of arrays is built. Each array in the initial population is built having a different placement of elements within the array. The initial population can be built by constructing P different arrays, where P is the number of arrays in the initial population. Optionally, the initial population can be "constructed" by building a single full array, that is, an array having an element in every lattice location, and processing signals from a selected subset of the elements. The use of a single full array allows one to model every possible thinned array having the same number of lattice locations as the full array. Similarly, the arrays can be built by modeling the arrays using a processing means such as a general purpose computer, digital signal processor, or the like.

Preferably, the arrays are built using a processing means to model the arrays. To enable the method to be practiced on or with the aide of a computer or similar processing means, EPPs can be used to describe the placement and weighting of each element in the array. The representation of element placement patterns can be encoded by creating an occupancy pattern x of N binary values representing the placement of elements within of the array. For uniformly weighted elements, N is the number of lattice locations in the array, and "0" denotes an empty location and "1" denotes placement of an element.

For arrays with non-uniformly weighted elements (shading), the occupancy pattern x can be implemented by incorporating multiple bits to code the weight of each array element. For example, allowing four bits to encode up to sixteen different weighting values for each element in an linear array of 20 lattice locations requires an occupancy pattern of eighty binary values. With such an implementation, the optimal placement and shading of elements are determined simultaneously.

The initial population can be comprised solely of arrays generated by random placement of elements or it can be comprised of a combination of random placement along with arrays having element placement estimating traditional solutions such as uniform, logarithmic, arithmetic, or geometric spacing.

In steps 20 and 50, each array in the current (or initial) population is evaluated and fitness value for each array is generated. The arrays are evaluated by measuring the directional response of the array. Based on the directional response a fitness value is generated according to fitness function 30 described below.

The directional response of each thinned array is evaluated by measuring the angular response of the array for a number of different angles $\psi$, where $\psi$ is the angle from broadside. Preferably the angles are equally spaced in $\sin \psi$ and run from 0° to 90°. The angular response of the array can be measured using any conventional technique. From the angular response, the mainlobe width can be estimated by interpolation. The peak sidelobe level is taken to be the greatest value beyond both the 6 dB down point and the first inflection of the response curve.

Because the objective of producing a minimum width mainlobe may conflict with minimizing the peak sidelobe level, a commensurability relationship between mainlobe width and sidelobe level may be needed. This relationship can also be used as fitness function 30 to determine the fitness value of the occupancy pattern. The fitness function can be defined as $$f(x) = \left\{ \frac{1}{m1} \cdot \min\left[ \left( \frac{s1}{40dB} \right)^2, 1 \right] \right\} \qquad (1)$$

where m1 is the 6 dB mainlobe width in degrees and s1 is the maximum sidelobe level in dB down from the main response of the corresponding full array. The exponent of 2 and the 40 dB denominator of the sidelobe term balances the relative importance of the two array performance parameters and can be modified for different design objectives. The minimum function, min[·], limits the optimization of the array with respect to s1 at the expense of m1. In addition to balancing mainlobe width and sidelobe level, the fitness function can include terms to balance other design parameters including fabrication constraints.

Step 60 analyzes the arrays and the entire population to determine if another generation will be produced or if the process is complete. Step 60 uses a predetermined threshold such as a specified number of generations, change in maximum population fitness, population diversity, or the like to determine whether another generation will be produced. Using the maximum population fitness for a threshold, step 60 will end the process if the maximum fitness does not significantly increase over a specified number of generations. For example, if the maximum fitness increases less than 1% over five generations, step 60 will end the process. Similarly, using population diversity as a threshold, step 60 ends the process if the population diversity decreases such that mutation is the sole mechanism for placement patterns. Population diversity can be determined using a hamming distance or similar clustering dendogram technique.

When step 60 ends the process using a predetermined threshold as discussed above, the most fit array in the population can be selected for the thinned array or the process can be initiated with a new initial population of randomly generated arrays.

The operation of the method of FIG. 2 will be described with reference to the fitness function and genetic operators described above with a constant population of 100 arrays and a mutation probability of 0.005. In step 10, the initial population of 100 arrays is generated by constructing arrays by random placement of elements within the array. Step 20 then determines the angular response of each of the 100 arrays in the initial population and generates a relative fitness value for each array according to the fitness function defined in equation (1).

In step 40, the reproduction operator generates a successor population by selecting arrays for retention from the initial (current) population. The reproduction operator continues to select the arrays with a probability proportional to their relative fitness until a reproduction population contains 100 arrays. The crossover operator generates new element placements in the arrays by randomly pairing arrays within the reproduction population and exchanging portions of the element placement patterns. The mutation operator toggles each element placement pattern location with a low probability. The elitism and equality operators are then applied to generate the successor population for evaluation by step 50.

Step 50 evaluates the angular response of each array in the population and then generates a fitness value for each array. Step 60 then determines whether another generation (new population) will be produced. If step 60 determines that another generation will be produced, the successor population becomes the current population and step 40 is initiated to generate a successor population from the current population.

The method provides a novel approach for generating a near-optimal element placement pattern for a thinned array that offers several significant advantages over prior art systems. The method provides an optimal response without having to evaluate a large number of possible solutions. The method enables the determination of an optimal element pattern when the number of possible solutions is too large to allow for a reasonably certain determination using conventional random array generation techniques. The method can be used to generate an optimal array having any type of element such as hydrophones, pressure sensors, optical sensors, or electromagnetic sensors. Furthermore, given a full array but constrained by limited processing capabilities, the present method can be used to determine which subset of elements to process for various signal frequencies. Thus, allowing a single array to be used for many different applications.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for determining placement of elements within a discrete lattice array comprising the steps of:

building a plurality of arrays, wherein each array is defined by an element placement pattern indicating the placement and weighting of each element within the array, said plurality of arrays defining an initial population;

determining a fitness value for each array within said plurality of arrays in the initial population using a fitness function which provides a measure of a relationship between peak sidelobe level and mainlobe width of an angular response of an array;

generating a reproduction population by selecting arrays from the initial population with probability proportional to their fitness values;

generating a successor population from said reproduction population, said successor population comprising a plurality of arrays wherein each array is defined by an element placement pattern indicating the placement and weighting of each element within the array;

generating a fitness value for each array in the successor population using said fitness function; and repeating the steps of generating a reproduction set, generating a successor population, and generating a fitness value for each array in the successor population until the successor population meets a threshold.

2. The method of claim 1 wherein said step of generating a successor population from said reproduction population comprises the steps of:

generating a crossover population from said reproduction population by applying a crossover operator; and applying a mutation operator to said crossover population.

3. The method of claim 2 wherein said step of generating a successor population from said reproduction population further comprises applying an elitism operator.

4. The method of claim 3 wherein said step of generating a successor population from said reproduction population further comprises applying an equality operator.

5. The method of claim 4 wherein said fitness function is given by $$f(x) = \left\{ \frac{1}{m1} \cdot \min\left[ \left( \frac{s1}{40dB} \right)^2, 1 \right] \right\},$$

where m1 is the 6 dB mainlobe width in degrees and s1 is the maximum sidelobe level in dB down from the mainlobe response.

6. A method for determining placement of elements within a discrete lattice array comprising the steps of:

building a plurality of arrays, said plurality of arrays defining an initial population;

determining a fitness value for each of the arrays in the initial population;

generating a reproduction population by selecting arrays from the initial population with probability proportional to their fitness values;

generating a successor population from said reproduction population;

generating a fitness value for each array in the successor population by measuring the angular response of each of the arrays in the successor population and using a fitness function given by $$f(x) = \left\{ \frac{1}{m1} \cdot \min\left[ \left( \frac{s1}{40dB} \right)^2, 1 \right] \right\},$$

where m1 is the 6 dB mainlobe width in degrees and s1 is the maximum sidelobe level in dB down from the mainlobe response, to generate the fitness value for each array based on the angular response of the array; and repeating the steps of generating a reproduction set, generating a successor population, and generating a fitness value for each array in the successor population until the successor population meets a threshold.

7. The method of claim 6 wherein said step of generating a successor population from said reproduction population comprises the steps of:

generating a crossover population from said reproduction population by applying a crossover operator; and applying a mutation operator to said crossover population.

8. The method of claim 7 wherein said step of generating a successor population from said reproduction population further comprises applying an elitism operator.

9. The method of claim 8 wherein said step of generating a successor population from said reproduction population further comprises applying an equality operator.

10. A method for determining placement of elements within a discrete lattice array comprising the steps of:

building a plurality of arrays, said plurality of arrays defining an initial population;

determining a fitness value for each of the arrays in the initial population;

generating a reproduction population by selecting arrays from the initial population with probability proportional to their fitness values;

generating a successor population from said reproduction population;

generating a fitness value for each array in the successor population; and repeating the steps of generating a reproduction set, generating a successor population, and generating a fitness value for each array in the successor population until the successor population meets a threshold;

wherein said step of generating a successor population from said reproduction population comprises generating a crossover population from said reproduction population by applying a crossover operator, applying a mutation operator to said crossover population, and applying an elitism operator.

11. The method of claim 10 wherein said step of generating a successor population from said reproduction population further comprises applying an equality operator.

12. The method of claim 11 wherein said step of generating a fitness value for each array in the successor population comprises the steps of:

measuring the angular response of each of the arrays; and using a fitness function to generate a fitness value for each array based on the angular response of the array.

13. The method of claim 12 wherein said fitness function is given by $$f(x) = \left\{ \frac{1}{m1} \cdot \min\left[ \left( \frac{s1}{40dB} \right)^2, 1 \right] \right\},$$

where m1 is the 6 dB mainlobe width in degrees and s1 is the maximum sidelobe level in dB down from the mainlobe response.

14. A method for determining placement of elements within a discrete lattice array comprising the steps of:

building a plurality of arrays, wherein each array is defined by an element placement pattern indicating the placement and weighting of each element within the array it defines, said plurality of arrays defining an initial population;

determining a fitness value for each of the arrays in the initial population;

generating a reproduction population by selecting arrays from the initial population with probability proportional to their fitness values;

generating a successor population from said reproduction population;

generating a fitness value for each array in the successor population by translating each element placement pattern into a thinned array, wherein the element placement and element weighting for the thinned array is described by the element placement pattern, measuring the angular response of each of the thinned arrays in the successor population, and using a fitness function to generate a fitness value for each element placement pattern based on the angular response of the thinned array defined by the element placement pattern; and repeating the steps of generating a reproduction set, generating a successor population, and generating a fitness value for each array in the successor population until the successor population meets a threshold.

15. The method of claim 14 wherein said step of generating a successor population from said reproduction population comprises the steps of:

generating a crossover population from said reproduction population by applying a crossover operator; and applying a mutation operator to said crossover population.

16. The method of claim 15 wherein said step of generating a successor population from said reproduction population further comprises applying an elitism operator.

17. The method of claim 16 wherein said step of generating a successor population from said reproduction population further comprises applying an equality operator.

* * * * *